Feb. 13, 1945. T. F. DOYLE 2,369,219
PROTECTIVE DEVICE FOR SEVERED HORNS
Filed July 15, 1942

Inventor
Thomas F. Doyle:
By Munn, Liddy & Glaccum
Attorneys

Patented Feb. 13, 1945

2,369,219

UNITED STATES PATENT OFFICE 2,369,219

PROTECTIVE DEVICE FOR SEVERED HORNS

Thomas F. Doyle, Nogales, Ariz.

Application July 15, 1942, Serial No. 451,058

5 Claims. (Cl. 128—1)

This invention relates to a device for sealing the surface of a severed portion of a horn of an animal. When a horn is cut off the exposed portion of the cut surface will discharge liquid matter, including blood, therefrom, which will attract insects that will lay eggs in the matter which when hatched become worms, and these worms commonly known as screw worms will cause a great deal of trouble. Cattle thus affected will not only lose weight and are not fit to be sent to the market for slaughter, but there is considerable loss by death.

It is an object of the present invention to provide a paste containing an antiseptic which is applied to the surface of the severed portion of the horn after said surface has been seared with a hot iron to stop the bleeding, after which a cap is securely affixed to the surface in any well known manner and since this cap or disk is formed of animal glue the natural secretion from the horn will combine with the glue and form an artificial scab, thus preventing the insects from laying eggs in the severed portion of the horn.

A further object of the invention is the provision of a protective means for the surface of the severed portion of a horn of cattle in which a cap formed of animal glue or other suitable material is secured to the surface after the surface has been sterilized.

This invention will be best understood from a consideration of the following detailed description in view of the accompanying drawing forming a part of the specification, nevertheless, it is to be understood that the invention is not confined to the disclosure, being susceptible of such changes and modifications as define no material departure from the salient features of the invention as expressed in the appended claims.

Figure 1:
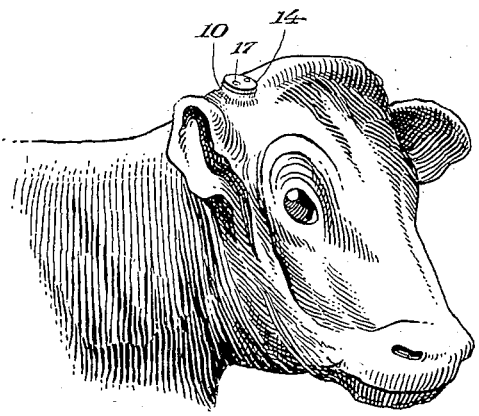
Figure 1 shows a head of an animal with severed horns and to which a protective means has been applied.
Figure 2:
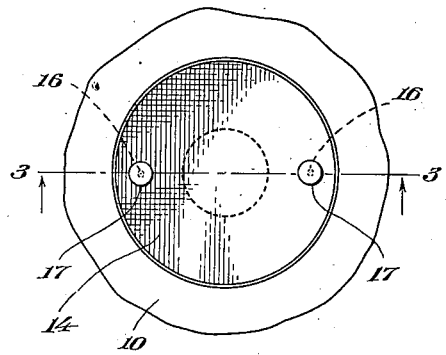
Figure 2 shows an enlarged plan view of the horn and sealing means in position.

Referring more particularly to the drawing, 10 designates a horn having a portion removed to provide a substantially flat surface.

When the horn is severed the cut naturally must be made through blood vessels and other matter, so that bleeding occurs and the blood and other fluids will coagulate on the outer surface 11. If no precautionary measures are taken a certain type of insect will lay eggs in this matter and when these eggs are hatched a screw worm is produced which feeds not only on the matter, but enters the central portion of the horn as indicated at 12, and causes an irritation in the affected parts whereby the cattle will lose weight.

By my improved method the outer surface 11 of the horn is sterilized in the first instance by the application of a hot iron to the surface and such application also stops bleeding.

Figure 3:
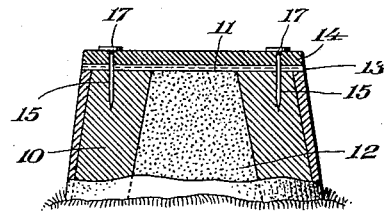
Figure 3 is a vertical section taken along the line 3—3 of Fig. 2.

To this cauterized surface is applied a thin sheet of paste indicated at 13 which contains among other ingredients, an antiseptic. On the top of this thin sheet of paste which is shown greatly exaggerated in Fig. 3, is applied a sealing cap or disk 14. This cap may be secured in any approved manner, but I prefer small nails 15 which are are driven through openings 16 in the disk 14 at diametrically opposite points, or the openings 16 may be spaced 120 degrees apart so that three nails will be employed or if desired four nails may be used at 90 degrees apart. Heads 17 on the nails aid in maintaining the cap or protective means 14 in position.

The paste 13 is formed of a mixture of asphalt varnish, flour or starch and an antiseptic. The antiseptic may be a product known on the market as Kreso-dip which is a solution of a soap and cresol which is normally used for disinfecting cattle. The cresol of commerce is a brownish-red syrupy liquid obtained from coal tar and usually contains a mixture of the three cresols. Other antiseptics may be employed such as phenol or creosote.

The asphalt or bituminous varnish consists of a bituminous base, a volatile solvent, and animal or vegetable drying oils with or without the presence of resins. Hard bituminous substances only are suitable for manufacturing varnishes, including the hard native asphalts, asphaltites, hard residual asphalts, hard rosin pitch or hard wood-tar pitch. The oils generally employed include linseed and China-wood or a mixture of the two. The bituminous base when mixed with the proper proportion of the oils will possess a liquid consistency and harden at room temperature by oxidation of the oils.

The quantity of the flour or starch employed is just sufficient to cause a thick paste so that the composition may be readily spread over the surface of the severed portion of the horn.

The outer cap 14 is formed preferably of animal glue because such glue is readily affected by the natural secretions of the horn so that the cap in a way will be welded onto the severed portion after it has been tacked in place. Thus the severed portion will be sealed completely from the atmosphere and will prevent the incursion of the troublesome screw worms. While the ordinary animal glue which is obtained from animal organs by boiling with water, straining and drying, may be employed, other glues which are obtained by the treatment of bones and hides may also be used.

In manufacturing the paste 13, one lb. of flour (wheat) is thoroughly incorporated in a mixture of one quart of asphalt varnish and one quart of Kreso-dip. This quantity is sufficient to treat the severed horns of 500 head of cattle.

I claim:

1. A device for protecting the cut on a stump of a horn of an animal after a portion of said horn has been removed comprising a paste formed of flour, asphalt varnish, and an antiseptic and a mucilaginous cap for hermetically sealing the paste on the horn.

2. A device for protecting the cut on a stump of a horn of an animal after a portion of said horn has been removed comprising a paste formed of flour, asphalt varnish, and an antiseptic and a cap formed of animal glue secured to the severed end of the horn.

3. A device for protecting the surface of a cross-section of a horn on an animal, said cross section being formed by cutting off the outer end of the horn, comprising a cap formed of animal glue and secured to the surface in spaced relation thereto and a thin sheet of paste containing an antiseptic located between the cap and the surface, said cap hermetically sealing the paste on the cross section, fluids secreted from the surface of the severed portion of the horn congealing with the glue so that the cap is sealed to said surface.

4. A device for protecting the exposed surface of a wound on a stump of a horn after the greater portion has been cut off, comprising a paste applied to the surface and containing a substance selected from the group consisting of cresol, phenol and creosote and a mucilaginous covering sealed to the surface by the paste and means for rigidly securing the covering to the horn.

5. A device for protecting a wound on the stump of a horn after a portion of said horn has been removed, comprising a thin sheet of paste containing an antiseptic covering the wound, and a cap formed of animal glue hermetically sealing the paste to the stump.

THOMAS F. DOYLE.